United States Patent [19]

Davidson

[11] Patent Number: 4,559,590

[45] Date of Patent: Dec. 17, 1985

[54] REGULATED DC TO DC CONVERTER

[75] Inventor: Christopher D. Davidson, Guelph, Canada

[73] Assignee: Varian Associates, Inc., Palo Alto, Calif.

[21] Appl. No.: 478,429

[22] Filed: Mar. 24, 1983

[51] Int. Cl.[4] .......................................... H02M 3/335
[52] U.S. Cl. ...................................... 363/21; 363/40; 363/133
[58] Field of Search ............... 323/222, 332, 345, 336; 363/15, 16, 20, 21, 131, 133, 39, 40, 45, 124, 25, 26; 307/240

[56] References Cited

U.S. PATENT DOCUMENTS

| | | | |
|---|---|---|---|
| 3,737,758 | 6/1973 | Allington | 363/60 |
| 3,828,239 | 8/1974 | Nagai et al. | 363/20 |
| 4,007,413 | 2/1977 | Fisher et al. | 363/18 |
| 4,184,197 | 1/1980 | Cu'k et al. | 363/16 |
| 4,257,087 | 3/1981 | Cu'k | 363/16 |
| 4,274,133 | 6/1981 | Cu'k et al. | 363/39 |
| 4,292,544 | 9/1981 | Ishii et al. | 363/16 |
| 4,449,175 | 5/1984 | Ishii et al. | 363/26 |

FOREIGN PATENT DOCUMENTS

| | | | |
|---|---|---|---|
| 56-88671 | 7/1981 | Japan | 363/16 |
| 819906 | 4/1981 | U.S.S.R. | 363/21 |
| 960767A | 9/1982 | U.S.S.R. | 323/332 |

Primary Examiner—Peter S. Wong
Assistant Examiner—Judson H. Jones
Attorney, Agent, or Firm—Stanley Z. Cole; Allan M. Lowe

[57] ABSTRACT

A DC-DC converter includes first and second switches to be opened and closed at mutually exclusive times at a predetermined frequency. The first switch is connected to an inductor and a transformer primary winding so that a first current component from a DC input supply flows through it via the inductor. A second current component having a sinusoidal component flows through the first switch in response to discharge of energy stored in a resonant circuit coupled to the transformer. The second component begins approximately simultaneously with closure of the first switch. The second switch, when closed, is connected so that a bi-directional current component flows through it in response to energy stored in the inductor. The rectifier is connected between the secondary winding and the load so the secondary winding supplies substantial current to the load.

35 Claims, 11 Drawing Figures

REGULATED DC TO DC CONVERTER

FIELD OF THE INVENTION

The present invention relates generally to DC to DC converters and more particularly to a converter including a resonant circuit coupled transformer having primary winding means connected to a DC input source via voltage isolating inductance means selectively shunted by a switch, and rectifier means for shunting current flowing in secondary winding means of the transformer while the switch is closed and for supplying current to a load while the switch is open.

BACKGROUND OF THE INVENTION

DC to DC converters are frequently employed to convert relatively low voltage DC sources into high voltage DC, suitable for applying voltages to DC loads, such as electron tube electrodes. For example, such converters are employed for supplying up to 4,500 volts between collector and cathode electrodes of high voltage traveling wave tubes. Such power supplies also desirably are capable of deriving DC voltages at several different levels and are responsive to a wide range of voltages from a DC source, and to supply medium power levels, e.g., 50–200 watts to the load. Because of the possible wide input voltage variation, it is necessary for such converters to be regulated. It is also important for the DC source, which is frequently a battery, to be isolated from the load and circuitry driving the load.

It is very important for high voltage output circuitry of such converters to have no high voltage inductor. A high voltage inductor frequently precludes the capability for multiple outputs, as required for high voltage electron tube energization, and adversely affects converter cost and size. It is also desirable for the converters to have relatively high efficiency, i.e., in excess of 85%, and to minimize ripple of input current derived from the DC source, particularly when the source is a battery. It is also desirable, but not necessary, for the load voltage ripple to be small, to minimize output filtering.

One class of converter that has been developed employs a transformer having primary winding means connected to the DC source and a secondary winding connected to rectifier circuitry for driving the high voltage load. Switching circuitry is connected to the primary winding means to chop the DC voltage from the input source into AC which is coupled by the transformer and secondary winding to the load via the rectifier, which converts the secondary winding AC into DC. Frequently, the switching circuitry is activated at a fixed frequency, with variable duty cycle. The output voltage is related to the input voltage, the duty cycle, and turns ratio between the primary winding means and the secondary winding. By varying the duty cycle, the DC voltage is regulated to compensate for variations of input voltage. Exemplary of circuits having this configuration are the forward converter, buck regulator with push-pull inverter, boost regulator with push-pull inverter, Venable converter, flyback or buck/boost converter, Sepic converter, and C'uk converter.

In these types of converters, it is desirable to provide flux cancellation in the transformer, as well as to minimize the number of switches and the number of elements having magnetic cores, which are heavy, require substantial space, and expensive. In addition, it is desirable for the current from the DC source to be automatically limited in response to the load being inadvertently substantially increased, e.g., by being short circuited. If such automatic current limiting is not provided the source may be effectively discharged or the converter damaged.

Of the previously mentioned prior art converters, the forward and Cu'k converters require high voltage inductors, and thereby are inappropriate for deriving high output voltages. The requirement for no high voltage inductor is so great that the Cu'k converter is inappropriate even though it otherwise has a higher figure of merit than any of the other named converters. While the flyback and Sepic converters do not require a high voltage inductor and are capable of handling wide ranges of input voltage and are current limited, these circuits do not provide transformer flux cancellation and have efficiencies less than 85%. In addition, the flyback converter has relatively large input current ripple. The flyback and Sepic circuits only use a single switch; the flyback circuit employs one magnetic core element, while the Sepic circuit employs two such cores. Both of these circuits also suffer from relatively high output voltage ripple and thereby have a figure of merit which is slightly lower than that of the Cu'k converter. The other named converters have figures of merit which are still lower than those of the flyback and Sepic converters.

It is, accordingly, an object of the present invention to provide a new and improved DC to DC converter particularly adapted for high voltage, multiple outputs.

Another object of the invention is to provide a new and improved DC to DC converter having a high figure of merit without employing a high voltage inductor.

An additional object of the invention is to provide a new and improved DC to DC regulated high voltage converter.

Another object of the invention is to provide a new and improved DC to DC regulated high voltage converter, particularly suitable for deriving multiple outputs from a DC source having a relatively low to medium DC voltage.

A further object of the invention is to provide a DC to DC high voltage converter, particularly suited for multiple outputs, wherein the converter does not include a high voltage inductor, is relatively efficient, is capable of handling a wide range of input voltages, has low input current ripple, provides voltage gain by controlling duty cycle, provides flux cancellation in a transformer, is automatically current limited, and employs a small number of switches as well as a small number of magnetic core elements.

BRIEF DESCRIPTION

In accordance with the present invention, a DC to DC converter includes a resonant circuit coupled to a transformer having primary winding means connected to a DC source via voltage isolating inductance means selectively shunted by a first switch and rectifier means for shunting current flowing in secondary winding means of the transformer while the switch is closed and for supplying current to a load while the switch is open.

More particularly, the invention relates to a converter responsive to a DC source for driving a DC load by way of a transformer having primary and secondary winding means. Inductor means, series connected between the source and the primary winding means, is connected to a first switch means that is closed at a predetermined frequency to shunt current flowing from the source through the inductor means, to isolate the DC source from the transformer. Resonant circuit means are coupled to the primary and secondary winding means. Rectifier means is connected between the secondary winding means and the load to supply the load with high voltage DC. The rectifier means includes a shunt diode for current flowing in the secondary winding means and a series diode for coupling current from the secondary winding means to the load. The directions of the transformer windings and the polarity of the shunt and series diodes are such that current flows through the shunt diode while the first switch means is closed and current flows through the series diode while the first switch means is opened. It was initially thought that the circuit of the invention would not function properly because excessive current would flow through the switch when it was initially activated to an on condition. The excessive current could destroy the switch, particularly if the first switch is of the bipolar or field effect transistor (FET) type. The excessive current is also disadvantageous because of the resulting inefficiency associated with dissipation in the switch. I have found that the initial high current through the first switch can be reduced to a level that does not cause these adverse effects by loading the secondary winding with an inductance, effectively connected in series with one of the transformer windings. The inductance limits the initial current through the first switch when the switch is activated to a conducting state. Preferably, the loading inductance is a parasitic inductance of the secondary, achieved by loosely coupling the secondary to the primary.

Because of the series inductance, there is a tendency for the voltage across the switch to reach a very high level when the first switch is cut off. In bipolar and FET switches, the high level causes avalanche current to flow through the first switch, with possible destructive effects on the switch. It is thus desirable to reduce the amplitude of this voltage level. In the preferred embodiments, the tendency is prevented by providing a series circuit including a capacitor and a second switch means, which series circuit is connected to the primary winding means.

When the first switch means is closed, a first current component from the supply flows through it via the inductor means storing energy in the inductor means. In addition, a second current component having a sinusoidal variation flows through the closed first switch in response to discharge of energy stored in the resonant circuit means. The second component begins approximately simultaneously with closure of the first switch means so that current flows in a first direction in the secondary winding when the first switch means is closed. The period of the resonant circuit is such that the current flowing in the secondary winding may or may not be cut off by the rectifier means prior to opening of the first switch means, depending upon duty cycle and load applied.

When the second switch means is closed, a bidirectional current component flows through it in response to energy stored in the inductor means and not transferable to this secondary circuit instantaneously due to the resonant circuit means. The DC source supplies energy to the transformer via the primary winding, directly only when the first switch means is open. The second switch means effectively regulates the voltage applied across the first switch means, when the first switch means is open. In addition, the second switch means assures continuous conduction of the inductor even if there is a no load condition allowing only one mode of operation. It is desirable for the converter to remain in one mode of operation, even under no load conditions, to minimize transients which would otherwise occur when a load is initially applied or removed.

The present invention does not employ any high voltage inductor, and thereby is particularly suited for high voltage, multiple outputs.

In a first embodiment, the primary winding means includes first and second closely coupled primary windings. The first primary winding is connected in series with a first blocking capacitor and the inductor means to be responsive to current flowing from the source through the inductor means when the first switch means is open. The second primary winding and the second switch means are connected in series with a second capacitor to provide an AC discharge path for the secondary winding means when the second switch means is closed. In this embodiment, current continuously flows, with minimum ripple, through the inductor when the first and second switch means are closed.

In a second embodiment, the primary winding means includes a primary winding connected in series with the DC source by a first, blocking capacitor and a coil forming the inductor means. A second capacitor is connected in series with the second switch means and the primary winding. In this embodiment, current also continues to flow through the inductor means, but the requirement for two closely coupled primary windings is eliminated. According to one variation of the second embodiment, the second capacitor and second switch means are connected in shunt with the primary winding. The second capacitor prevents overshoot of voltages across the first switch means when the first switch means turns off. This variation enables a relatively low voltage to be maintained across the second capacitor.

In accordance with a variation of the second embodiment, the second capacitor and second switch means are connected in shunt with a series circuit including the primary winding and first capacitor so that when the second switch means is closed some of the current flowing through the first capacitor also flows through the second capacitor.

In accordance with still a further embodiment, the primary winding means includes a primary winding and the inductor means includes an input inductor having first and second windings. The first winding is connected in series with the source and the primary winding. A first capacitor is connected in series with the primary transformer winding and the second winding of the input transformer. The first capacitor is also connected in series with a storage capacitor and the first switch means when the first switch means is closed. The first capacitor is connected in series with the primary winding, second switch means, storage capacitor and second input transformer winding when the second switch means is closed. Current flows in first and second opposite directions in the storage capacitor while the first and second switches are respectively closed.

This embodiment, while being somewhat complex, is relatively efficient and provides increased voltage gain because it operates in push-pull. During the interval while the first switch is closed, one terminal of the transformer primary winding is grounded, and during the time while the second switch means is closed, the other terminal of the transformer primary winding is grounded through the first capacitor. This embodiment requires a lower transformer turns ratio to achieve the same voltage gain as in the other embodiments, has a higher degree of symmetry, and needs only a single transformer primary winding. However, in addition to the requirement for a relatively complex input transformer as the inductor means, there is a high input ripple current, having a waveform closely resembling a rectangular wave.

According to still a further aspect of the invention, the input inductor means and the transformer are inductively coupled, by winding them on the same magnetic core. This is possible because the voltages impressed across the inductor means and the primary transformer winding means have essentially the same waveforms. By magnetically coupling the inductor means to the transformer, the ripple current supplied by the source to the converter can be considerably reduced, in some instances to zero.

The converter of the present invention has been found to have a figure of merit equal to that of the C'uk converter, for all embodiments, except the push-pull embodiment. The present invention, however, does not require a high voltage inductor; employs only two switches and in the optimum case only requires a single magnetic core. The converter has an efficiency in excess of 85%, is capable of responding to input voltages having a three to one variation, has low input ripple, except in the push-pull configuration, provides gain as a function of duty cycle, has transformer flux cancellation and is automatically current limited. The only disadvantage of the present invention is that the output voltage has somewhat significant ripple.

The above and still further objects, features and advantages of the present invention will become apparent upon consideration of the following detailed description of several specific embodiments thereof, especially when taken in conjunction with the accompanying drawings.

DETAILED DESCRIPTION

Figure 1:
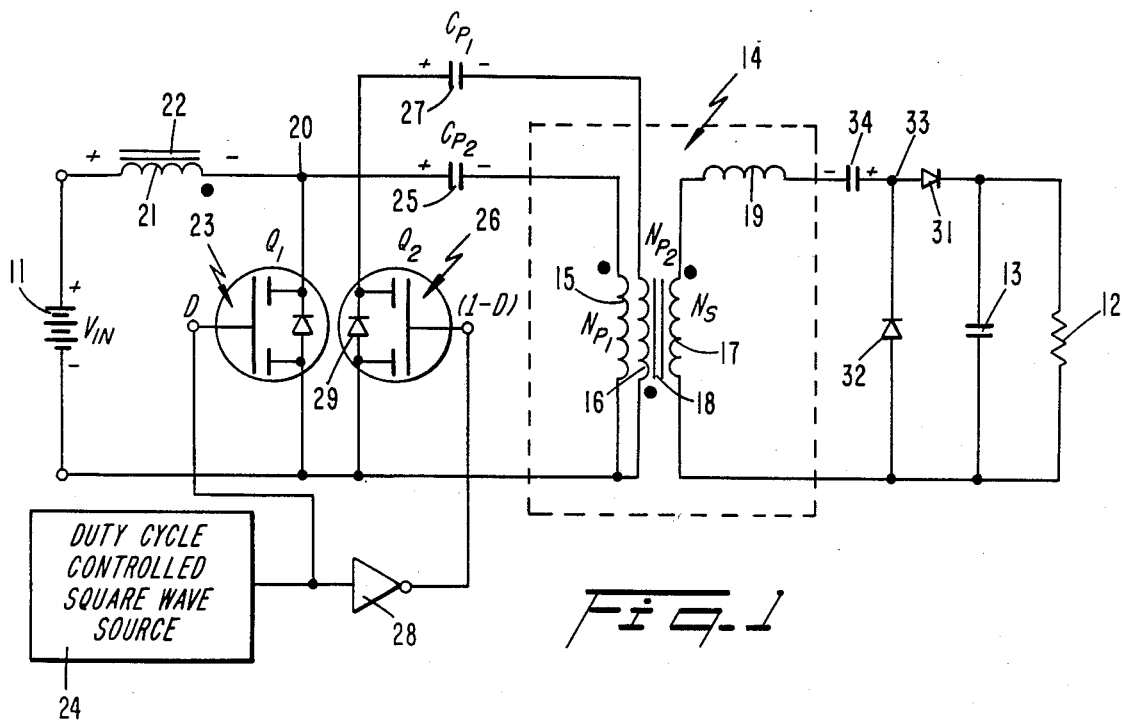
FIG. 1 is a circuit diagram of one embodiment of the invention employing a transformer having two primary windings.

Reference is now made to FIG. 1 of the drawing wherein the voltage from DC source 11, typically a battery or, in certain instances, the output of an AC to DC rectifier circuit, is converted by a circuit including transformer 14 into high voltage DC supplied to load 12, shunted by capacitor 13. Transformer 14 includes a primary winding means comprising bifilar closely coupled windings 15 and 16 (preferably having the same number of turns) and secondary winding 17, loosely coupled to windings 15 and 16 by magnetic core 18. Because of the loose coupling between secondary winding 17 and the primary winding means, there is an appreciable parasitic inductance, represented by inductor 19, reflected from secondary winding 17 to the primary winding means; a typical value for inductance 19 is 80 microhenries referred to the secondary (50 microhenries referred to the primary). As indicated by the dot convention, windings 15 and 17 are wound so that the application of positive current to the dotted terminal of winding 15 results in the derivation of a positive voltage at the dotted terminal of winding 17. Similarly, the application of positive current to the dotted terminal of winding 16 results in the derivation of a positive voltage at the dotted terminal of winding 17. A positive current applied to the dotted terminal of winding 17 results in positive voltages being developed at the dotted terminals of windings 15 and 16.

DC source 11 is connected, but effectively isolated, from winding 15 by an inductance means comprising coil 21, coupled to magnetic core 22 so that the inductance of the coil is substantial. Current flowing from DC source 11 through coil 21 is selectively shunted, at a predetermined frequency, to the negative terminal of source 11 by a switch means including the source drain path of power N-channel MOSFET 23, activated into a conducting state in response to an output of duty cycle controlled rectangular wave source 24. Common terminal 20 for MOSFET 23 and coil 21 is connected by way of blocking capacitor 25 to the dotted terminal of primary winding 15, the undotted terminal of which is connected to the negative electrode of source 11. Energy is transferred through transformer 14 through MOSFET 23 when the source drain path of the MOSFET is closed, to derive a current component having a sinusoidal like variation, as described infra.

Energy not transferred through transformer 14 when MOSFET 23 is turned off is transferred to capacitor 27 by means of power N-channel MOSFET 26 and is subsequently returned to the load or the source. MOSFET 26 is switched to a closed condition at times mutually exclusive to the times when MOSFET 23 is switched to a closed condition, by virtue of the output of rectangular wave source 24 being coupled to the gate electrode of MOSFET 26 by way of inverter 28. Both power MOSFET's are capable of conducting current in either direction because such MOSFET's are manufactured with the source drain electrodes thereof shunted by an anti-parallel diode. If power bi-polar transistors are utilized in place of power MOSFETs 23 and 26, anti-parallel diodes must be connected between the emitter and collector electrodes thereof.

Duty cycle controlled rectangular wave source 24 has a predetermined, but variable duty cycle square wave output. The duty cycle, D, of source 24 can be preset to provide the desired voltage across load 12. Alternatively, the duty cycle of source 24 can be controlled in response to voltage variations of DC input source 11 or in response to the voltage across load 12, to maintain the load voltage constant, as a function input and/or output voltage variations.

In one embodiment, the output circuit connected between transformer 14 and load 12 includes a rectifier means comprising series diode 31 and shunt diode 32, poled so that the diodes conduct at mutually exclusive times. Terminal 33, common to the cathode of diode 31 and the anode of diode 32, is connected to the dotted terminal of transformer winding 17 by way of capacitor 34. The anode of diode 31 is connected to a first, common terminal for load 12 and capacitor 13, while the anode of diode 32 is connected to a common terminal for the undotted terminal of winding 17 and the other common terminal of load 12 and capacitor 13.

The reactive components, i.e., coil 21, capacitors 13, 25, 27 and 34, are such that under steady state operation the current flowing through the coil and the voltages across the capacitors remain relatively constant during each cycle of source 24. Because windings 15, 16 and 17 are respectively connected to capacitors 25, 27 and 34, no DC current is supplied to any winding of transformer 14, so that the transformer is not susceptible to saturation. It can be shown that the voltage supplied to load 12 is:

$$V_o = \frac{V_{IN} N_s}{(1-D)N_{Pl}} \qquad (1)$$

where
$V_o$ is the voltage across load 12,
$V_{IN}$ is the voltage of source 11,
D is the duty cycle of source 24,
$N_s$ is the number of turns of secondary winding 17, and
$N_{Pl}$ is the number of turns of primary winding 15.

Typically, the value of D varies between 0.2 and 0.8; with D=0.2, $V_o$ is 1.25 times the voltage of source 11 multiplied by the turns ratio between windings 17 and 15; with D=0.8, $V_o$ is five times the product of the turns ratio and the input voltage, allowing the output voltage to be regulated by duty cycle control for an input voltage range of up to 4:1.

The circuit including windings 16, MOSFET 26 and capacitor 27 prevents the voltage at common terminal 20 for coil 21 and capacitor 25 from exceeding an ideal amount which maintains ramp variations for the current flowing through inductor 21 when MOSFET 23 is opened. There is a tendency for the voltage at terminal 20 to increase when MOSFET 23 is open circuited due to the energy stored by inductance 21 not being completely coupled through transformer 14. Controlling the voltage at the common terminal for coil 21 and capacitor 25 enables current to flow continuously through inductor 21 throughout a complete cycle of square wave source 24. This enables excess energy to be returned to source 11 and/or to be supplied to load 12. Capacitor 34 enables the output voltage across load 12 to equal the peak to peak voltage across secondary winding 17, and prevents coupling to core 18 of DC flux resulting from current from source 11. Leakage inductance 19 prevents excessive peak currents from flowing through closed MOSFET 23 via the otherwise low impedance path reflected from diode 32 to primary winding 15.

Figure 2:
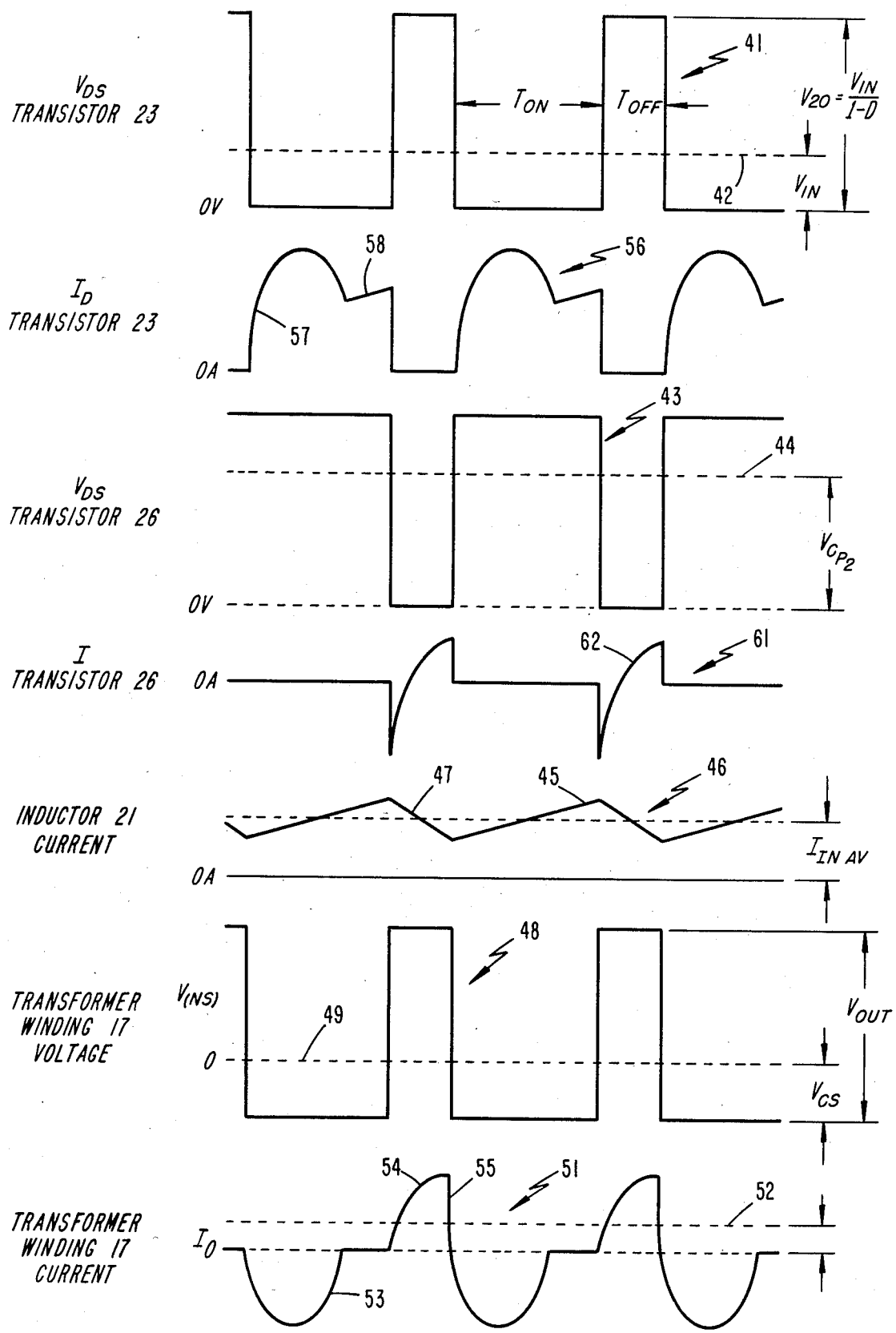
FIG. 2 is a series of waveforms used for describing the operation of the circuit of FIG. 1.

To describe the operation of FIG. 1, consideration is now given to the waveforms of FIG. 2, all of which assume ideal, lossless conditions, with a duty cycle of about 75%. The voltage between the source drain electrode of MOSFET 23 is represented by waveform 41, having a zero value when square wave source 24 forward biases MOSFET 23. When MOSFET 23 is back biased, the voltage across the source drain path of the MOSFET is $$V_A = \frac{V_{IN}}{(1-D)}.$$

The average voltage across the source drain path of MOSFET 23 is $V_{IN}$, as represented by line 42. When MOSFET 26 is closed, the voltage between the source and drain electrodes thereof is zero, as indicated by waveform 43. The average voltage across the source drain electrodes of MOSFET 26 is equal to the DC voltage across capacitor 27, which can be shown to equal $$\frac{V_{IN} D}{(1-D)},$$

as indicated by line 44. The periods while switches 23 and 26 are closed are respectively assumed to be and indicated by D and (1−D). The maximum voltage across MOSFET 26, when the MOSFET is cut off, is $$V_{IN} \frac{1}{(1-D)}.$$

While MOSFET switch 23 is closed, a positive going positive current ramp flows from source 11 through coil 21, as indicated by ramp 45 of waveform 46. When MOSFET 23 is cut off and MOSFET 26 is forward biased, positive current flows from source 11 through coil 21 and capacitor 25 to primary winding 15, to supply energy to transformer 14; the current at this time has a negative ramp variation, as indicated in waveform 46 by ramp 47.

In response to the continuous current flowing in coil 21 and the voltage variation across MOSFET 26, there is impressed across secondary winding 17 rectangular wave voltage waveform 48. Waveform 48 has a zero average value, indicated by line 49; a negative value equal to the voltage across capacitor 34 while MOSFET 23 is on; and a positive value equal to the voltage indicated by Equation (1) minus the DC voltage across capacitor 34 when MOSFET 26 is conducting. In response to the transformer secondary winding voltage indicated by waveform 48 and load 12, a current indicated by waveform 51 flows through transformer secondary winding 17. Waveform 51 has a zero DC value. The load current as indicated by line 52 is equal to the average of the positive going portion of wavefore 55.

While MOSFET 23 is conducting, waveform 51 has a sinusoidal variation 53 with initial and final values of zero. Variation 53 occurs in response to the series resonant circuit which is established across the terminals of secondary winding 17 through parasitic inductance 19, capacitor 34, capacitor 25 and diode 32 in response to the negative voltage impressed across the secondary winding. Variation 53 has a duration approximately equal to one-half of the frequency of the resonant circuit coupled to winding 17. The parameters of the series resonant circuit are such that sinusoidal variation 53 is completed prior to turn off of MOSFET 23, i.e., while the MOSFET is still conducting. As load 12 increases, the spacing between the end of sinusoidal variation 53 and the beginning of sinusoidal like variation 54 decreases.

It has been found experimentally that the duty cycle and the relative resonant and switching frequencies can be such that less than one-half cycle of current flows through either or both of FETs 23 and 26 each time they are activated to a conducting state.

During steady state operation, capacitor 25 is charged to a DC voltage of $V_{IN}$ so that the electrode thereof connected to terminal 20 is positive relative to the electrode thereof connected to the dotted terminal of primary winding 15. At steady state the electrode of capacitor 27 connected to the source drain path of MOSFET 26 is at a positive voltage of $$\frac{V_{IN}D}{1-D}$$

relative to the electrode thereof connected to the undotted terminal of primary winding 16. Capacitor 34 is biased so that the electrode thereof connected to terminal 33 has a positive voltage of $$\frac{V_{IN}N_s}{N_p}$$

relative to the electrode connected to the dotted terminal of secondary winding 17 via inductance 19.

When MOSFET 23 is forward biased, energy stored in capacitor 25 is transferred through the circuit connected to winding 15 and winding 17 through the source drain path of MOSFET 23 to capacitor 34. Energy transferal in the circuit connected to secondary winding 17 occurs in response to the current flowing from capacitor 25 to terminal 20, thence through the source drain path of MOSFET 23 and into the undotted terminal of transformer 15. Current flowing into the undotted terminal of winding 15 causes current to flow in a first direction out of the undotted terminal of secondary winding 17, through diode 32 and capacitor 34 to the dotted terminal of winding 17 via inductance 19. A series resonant circuit including capacitor 34, capacitor 25 and inductance 19, is thereby connected and is reflected to primary winding 15 in series with the current flow. The series resonant circuit current reflected from secondary winding 17 to primary winding 15 has a sinusoidal variation, indicated by half sinusoidal waveform segment 53 of waveform 51. Sinusoidal wave segment 53 thus has a duration less than one-half of the frequency of the series resonant circuit connected across winding 17. Waveform 53 begins simultaneously with forward biasing of MOSFET 23 and continues until there is an attempted reversal in the polarity of the current flowing in secondary winding 17, at which time diode 32 cuts off.

For the example waveform shown, waveform segment 53 terminates and has a zero value prior to MOSFET 23 being back biased by source 24, a result achieved by judicious design of inductance 19 and the value of capacitor 34.

Sinusoidal wave segment 53 and positive going ramp 45 combine in the source drain path of MOSFET 23 with a current component coupled to winding 15 from transformer 14 to derive wave segment 57 of waveform 56. Upon completion of wave segment 53, waveform 56 has a positive going ramp segment 58, resulting from the combination of ramp 45 and a magnetizing component of transformer 14 flowing in winding 15. Ramp wave segment 58 ends simultaneously with cut off of MOSFET 23. While MOSFET 23 is cut off, waveform 56 has a constant, zero value.

During the interval while transistor 23 is forward biased, no current flows from winding 17 through diode 31 because diode 31 is back biased, causing current to be supplied to load 12 by shunt capacitor 13.

In response to MOSFET 23 being cut off, current initially flows to capacitor 27 through the undotted terminal of primary winding 16 thence from the dotted terminal through the diode shunting the source drain path of MOSFET 26 to the dotted terminal of primary winding 16, thence through the primary winding back to capacitor 27. The flow of positive current out of the dotted terminal of winding 16 results from current flowing out of inductor 21 into the dotted end of winding 15. This current is not instantaneously reflected to the load through winding 17, capacitor 34 and diode 31 because of the presence of leakage inductance 19.

The current flowing through diode 31 while MOSFET 23 is cut off charges capacitor 13 and powers load 12. Because of the resonant circuit formed by inductance 19, capacitor 34 and capacitor 25, current, having waveform 51, flows from secondary winding 17 to load 12 through diode 31 and includes sinusoidal variation 54. Variation 54 begins simultaneously with the cutoff of MOSFET 23 and continues until the MOSFET is turned on, at which time the current in winding 17 suddenly drops to zero, as indicated by straight line segment 55 of waveform 51.

The sinusoidal variation in secondary winding 17 is coupled to primary winding 16. Winding 16 is also, at this time, responsive to the negative going current ramp 47 which flows through primary winding 15 in response to the connection established from source 11 through coil 21 and capacitor 25 to primary winding 15. Winding 16 is also responsive to the DC component of the current flowing from source 11 through winding 15, which effects the magnetic flux in core 18. These three components combine to cause the current waveform 61 through the source drain path of MOSFET 26 to include sinusoidal like component 62. Waveform 61 has an average value of zero because the current associated with it flows through capacitor 27. While MOSFET 26 is cut off, the source drain current thereof is zero. When MOSFET 23 is initially cut off, the current through MOSFET 26 initially flows negatively through the shunt source drain diode thereof and then increases in accordance with bipolar, sinusoidal like variation 62. When the current through MOSFET 26 reverses polarity, it flows through the MOSFET in the normal manner. When MOSFET 26 is cut off and MOSFET 23 begins conducting, current no longer flows in primary winding 16 and variation 62 suddenly ends, causing the current flowing through capacitor 27 to return suddenly to zero.

Variation 62 has an initial negative value and a final positive value, with sudden transitions between the zero value and the initial and final values. Variation 62 occurs in response to sinusoidal like variation 54 in the current of secondary winding 17, as well as in response to AC components of ramp 47, as coupled through capacitor 25 to winding 15, thence to winding 16. Thus, the combination of winding 16, capacitor 27 and the closed source drain path of MOSFET 26 controls the voltage across the open circuit path between the source and drain of MOSFET 23, to prevent overshoot at common terminal 20. In addition, energy stored in the resonant circuit coupled to primary winding 16 from secondary winding 17 is transferred to capacitor 27 and then is transferred to the source or the load.

For low loads wherein the DC current through inductor 22 is relatively low so that there are times during each cycle when negative current flows through the inductor, it is necessary for current to flow in a reverse direction through MOSFET 23. The diode shunting the source drain path of MOSFET 23 accomodates this current. The source drain shunt diodes of MOSFETs 23 and 26 conduct reverse current during initial turn on instants of the MOSFETs when the bidirectional source drain paths of the MOSFETs are not fully conducting. The gate circuits of MOSFETs 23 and 26 are designed to prevent simultaneous conduction through the source drain paths to prevent short circuits, a result achieved by cutting off the MOSFETs immediately in response to the trailing edges 24 and providing a relatively long time constant for the leading edges of source 24. To these ends, a relatively large value resistor is connected in series between source 24 and the gate of MOSFET 23, and between inverter 28 and the gate of MOSFET 26 while a lower value resistor is connected in series with an appropriately poled diode between source 24 or inverter 28 and the gate of each MOSFET.

Figure 3:
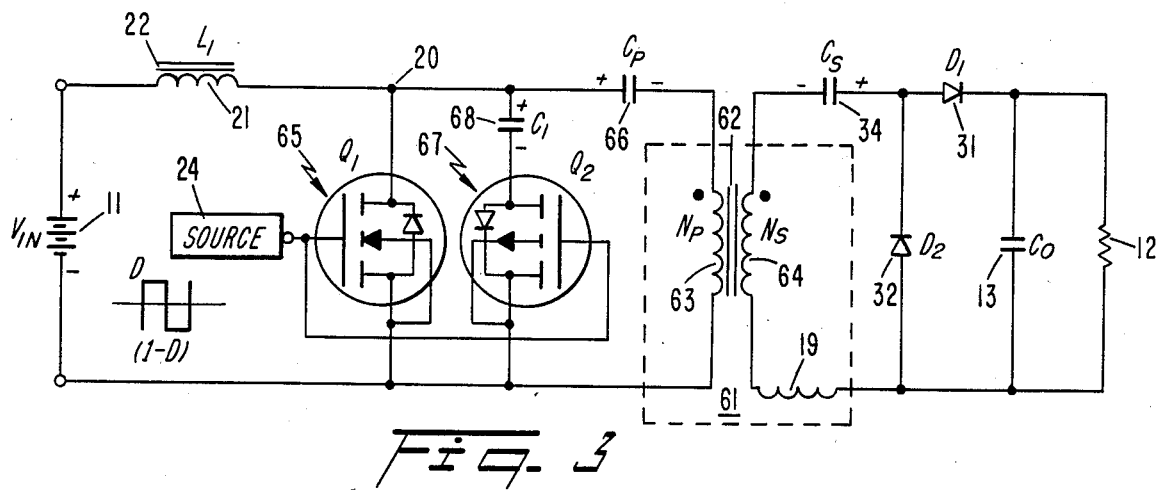
FIG. 3 is a circuit diagram of a second embodiment of the invention employing a transformer having a single primary winding.

FIG. 3 is a circuit diagram of a second embodiment of the invention, having waveforms similar to those derived in connection with FIG. 1, as illustrated in FIG. 2. The circuit of FIG. 3 differs from that of FIG. 1 because the primary winding means of FIG. 3 only requires one winding, series connected with a blocking capacitor; the series combination of the blocking capacitor and primary winding are selectively shunted by a switch means series connected with a capacitor. The switch means and capacitor are selectively shunted by a switch means that is responsive to the current through the inductance means. Also, the first and second switches in the FIG. 1 embodiment are both N-channel MOSFETs, while the first and second switches in the FIG. 3 embodiment are respectively N- and P-channel MOSFETs. Complementary MOSFETs are used in FIG. 3 because no phase reversal is provided for the transformer current coupled to the second MOSFET, as is attained with winding 16, FIG. 1.

In particular, the circuit of FIG. 3 includes transformer 61, having magnetic core 62 and loosely coupled primary and secondary windings 63 and 64. Secondary winding 64 is connected to load 12 and shunt capacitor 13 by a rectifier circuit including series diode 31 and shunt diode 32, connected to capacitor 34, in exactly the same way as winding 17 is connected to load 12. Windings 63 and 64 are wound in the same relative directions as windings 15 and 17.

The circuit connected to primary winding 63 differs somewhat from the circuit connected to primary windings 15 and 16, although DC source 11 is connected in the same way to coil 21 in both embodiments. Terminal 20 is selectively shunted to the negative terminal of DC source 11 through N-channel MOSFET 65 with a duty cycle of D. To this end, the gate of MOSFET 65 responds to the positive portion of the cycle derived from square wave source 24.

Connected in series with winding 63, between the dotted terminal thereof and terminal 20, is blocking capacitor 66. Blocking capacitor 66 and winding 63 are selectively connected through the source drain path of P-channel MOSFET 67 to capacitor 68. MOSFET 67 includes a gate connected to source 24 so that the MOSFET switch is activated to a closed (on) state for an interval of (1−D) in response to the output of source 24. To activate MOSFETs 65 and 67 into the on and off states in a complementary manner, source 25 derives square wave segments having values of +10 volts during the interval while MOSFET 65 is on and −10 volts during the interval while MOSFET 67 is on. MOSFETs 65 and 67 include antiparallel diodes, in the same manner as the antiparallel diodes of FIG. 1, except that the antiparallel diode of MOSFET 67 conducts positive current to the common connection of the negative electrode of power supply 11 and the transformer primary.

The circuit of FIG. 3 functions in substantially the same manner as the circuit of FIG. 1, whereby the current variation through coil 21 of both embodiments is substantially the same. The current through MOSFET 65 has a variation the same as the variations of waveform 56 except that it is of opposite polarity, while the current through MOSFET 67 and capacitor 68 has a waveform that is substantially the same as the variations of waveform 61 except of opposite polarity. Capacitor 68 charges to an average DC voltage of $$\frac{V_{IN}}{(1-D)},$$

to prevent overshoot of the voltage at terminal 20 when MOSFET 65 is cut off. MOSFET 67 returns excess energy to source 11 or load 12.

When MOSFET 65 is forward biased, the current components flowing through it are from DC source 11 and coil 21, as well as from primary winding 63, as influenced by the resonant circuit connected to secondary winding 64, as well as the magnetizing current in transformer 61. When MOSFET 67 is conducting, the current components through it are the negative going ramp components of source 11, as coupled through coil 21 and capacitor 68, as well as the components induced in primary winding 63 from the circuit connected to secondary winding 64, and magnetizing current of transformer 61.

Figure 4:
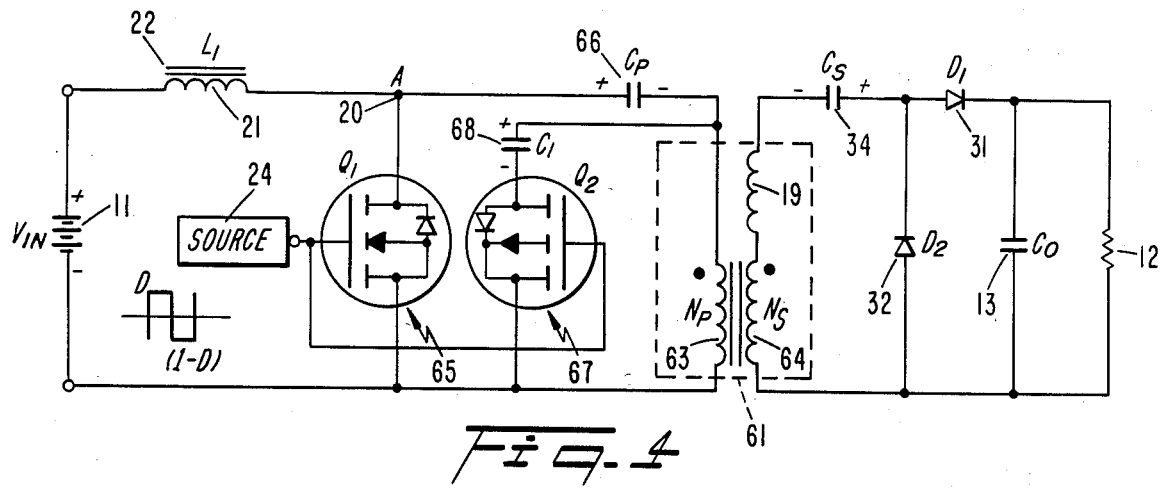
FIG. 4 is a circuit diagram of a variation of the embodiment of FIG. 3.

The circuit of FIG. 3 can be modified as illustrated in FIG. 4. The circuit of FIG. 4 is identical to that of FIG. 3, except that there is a direct connection from the dotted end of primary winding 63 to capacitor 68. Terminal 20 is connected to capacitor 66, and thence to capacitor 68; there is no direct connection of capacitor 68 to terminal 20. Thus, MOSFET 67 and capacitor 68 directly shunt primary winding 63 when MOSFET 67 is forward biased. The variation of FIG. 4 enables the voltage across capacitor 68 to be less than in the circuit of FIG. 3, with resulting lower cost, because a capacitor with a lower voltage rating can be employed.

Figure 5:
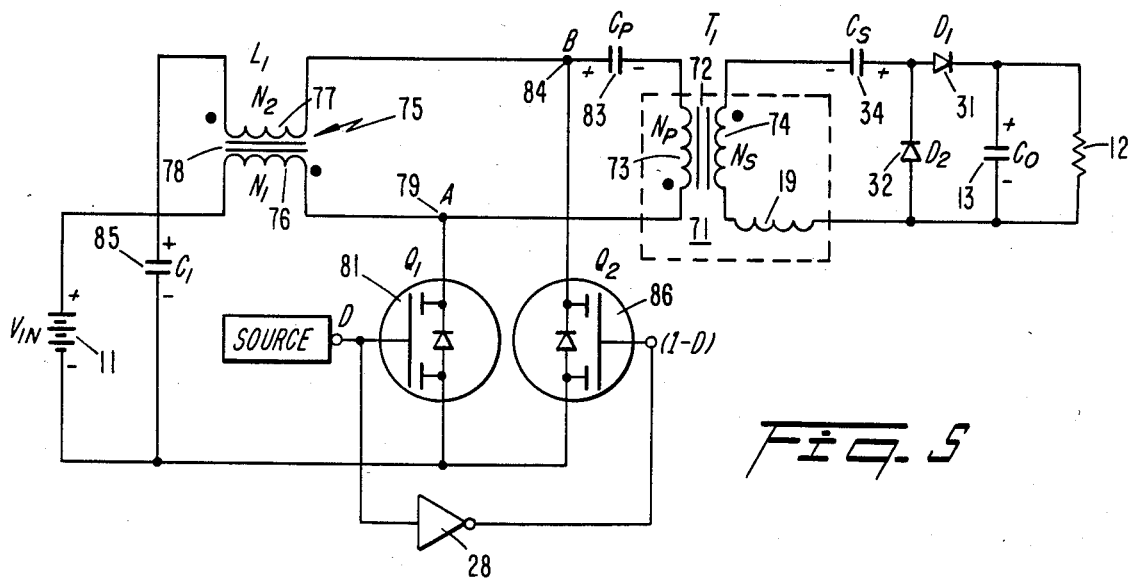
FIG. 5 is a circuit diagram of another embodiment of the present invention, employing a single transformer primary winding driven in push-pull relation.

Reference is now made to FIG. 5 of the drawing, a circuit diagram of still another embodiment of the invention. The embodiment of FIG. 5 operates on a push-pull basis, a result achieved by providing a somewhat complex input inductor, configured as a two winding transformer. The circuit of FIG. 5, however, requires a simple, loosely coupled transformer, of the type employed in the embodiments of FIGS. 3 and 4.

In particular, the circuit of FIG. 5 includes transformer 71, including magnetic core 72 as well as primary and secondary windings 73 and 74 which are loosely coupled to each other in the same manner that windings 15 and 16 are loosely coupled to winding 17. Secondary winding 74 is connected to capacitor 34, diodes 31 and 32, capacitor 33 and load 12 in the same manner that winding 17 is connected to corresponding elements.

Primary winding 73 is driven by current derived from DC source 11 and coupled to opposite terminals thereof by input inductor 75. Inductor 75 includes primary and secondary windings 76 and 77, preferably having the same number of turns, and magnetic core 78. The turns of windings 76 and 77 are closely coupled to each other by a bifilar arrangement. The resulting high interwinding capacitance, however, is at a steady DC bias and does not have to be charged and discharged during each switching cycle. Windings 76 and 77 are wound so that the voltage variations across them are replicas of each other, but reversed in polarity, as indicated by the dot convention. Winding 76 is DC series connected between the positive electrode of source 11 and the dotted terminal of primary winding 73. Common, dotted terminals 79 of windings 73 and 76 are selectively connected to the negative electrode of source 11 through the source drain path of power N-channel MOSFET 81 when the MOSFET is forward biased for the duty cycle D. The source drain path of MOSFET 81 is internally shunted by an anti-parallel diode, so that bipolarity current can flow between the MOSFET source and drain electrodes.

The undotted terminal of primary winding 73 is connected to the undotted terminal of winding 77 by way of blocking capacitor 83. Common terminal 84 of winding 77 and capacitor 83 is selectively connected to one electrode of storage capacitor 85 by way of the source drain path of power N-channel MOSFET 86 for a duty cycle of (1−D), at times mutually exclusive to times when MOSFET 81 is forward biased. To enable bidirectional currents to flow between the source and drain electrodes of MOSFET 86, an integral anti-parallel diode 87 is connected between the source and drain electrodes. The remaining electrode of capacitor 85 is connected to the dotted end of transformer 77.

When MOSFET 81 is forward biased, a current path subsists from the positive electrode of source 11 through windings 76 and the source drain path of MOSFET 81 to the negative electrode of source 11. Simultaneously, a discharge path is provided for energy in transformer 71, from the dotted end of winding 73 through the source drain path of MOSFET 81, thence through capacitor 85, winding 77 and capacitor 83.

When MOSFET 86 is forward biased to the exclusion of MOSFET 81, current flows from the positive electrode of source 11 through winding 76, thence through winding 73 and capacitor 83 and to the negative electrode of source 11 via the source drain path of MOSFET 86. Simultaneously, a discharge path is provided for capacitor 85 via the path through winding 77 and the source drain path of MOSFET 86. For low load, immediately after cutoff of MOSFET 86, current flows between terminal 79 and the common terminal for the negative electrode of source 11 and capacitor 85 through the shunt diode of MOSFET 81.

The DC steady state voltages across capacitors 83 and 85 can be shown to be respectively represented by:

$$V_{83} = \frac{(2D - 1)V_{IN}}{1 - D} \quad (2)$$

$$V_{85} = \frac{DV_{IN}}{1 - D}. \quad (3)$$

In steady state operation, capacitor 85 is charged so that the electrode thereof connected directly to the dotted terminal of winding 77 has a positive polarity relative to the voltage at the other electrode of capacitor 85. In contrast, the polarity of the voltage across capacitor 83 is a function of duty cycle, D, of MOSFET 81. For a duty cycle of one-half, i.e., $D = \frac{1}{2}$, the voltage across capacitor 83 is zero. For values of D less than one-half, the electrode of capacitor 83 directly connected to the undotted terminal of winding 73 is positive relative to the capacitor electrode connected directly to terminal 84; for values of D greater than one-half, the voltage on the electrode of capacitor 83 directly connected to the undotted terminal of winding 73 is less than the electrode of the capacitor connected directly to terminal 84. The values of capacitors 83 and 85 and the period of the source driving MOSFETs 81 and 86 into conducting states are such that there are only slight voltage variations across the capacitors, relative to the voltage across source 11 and the voltage changes across other components connected to primary winding 73.

Complementary voltage waveforms, each having a peak to peak variation of $$\frac{V_{IN}}{1 - D},$$

at terminals 79 and 84 are impressed across primary winding 73 which thereby has a total peak to peak variation of $$\frac{2V_{IN}}{(1 - D)}.$$

In response to the voltage impressed across primary winding 73, the voltage supplied to load 12 is:

$$V_o = \frac{2V_{IN}N_s}{(1 - D)N_p} \quad (4)$$

where
$N_s$ is the number of turns in secondary winding 74, and $N_p$ is the number of turns in primary winding 73.

The circuit of FIG. 5 functions, in certain respects, similarly to the circuit of FIGS. 1, 3 and 4. In particular, current from source 11 that flows through winding 76 while MOSFET 81 is conducting causes energy to be stored in core 78. This energy is coupled to load 12 via transformer 71 and diode 31 when MOSFET 81 is cut off and MOSFET 86 is conducting. Further, capacitor 83 and forward biased MOSFET 86 provide a discharge path for energy stored in transformer 71 when MOSFET 81 is cut off. Diodes 31 and 32 conduct during the intervals while MOSFETs 86 and 81 are respectively forward biased. Current may flow through diode 32 for only a portion of the time while MOSFET 81 is forward biased, again depending upon the selection of the value of capacitor 84 and the parasitic inductance between loosely coupled windings 73 and 74, the operating duty cycle and the amount of load applied. However, the duty cycle and relative frequencies of source 24 and the resonance frequency of the circuit can be such that the secondary current flows during the entire time while MOSFET 81 is forward biased.

There are, however, some significant differences between the circuit of FIG. 5 relative to those of FIGS. 1, 3 and 4. In particular, while MOSFET 86 is conducting storage capacitor 85 effectively functions as a second voltage source of value $$\frac{V_{IN}D}{1-D}.$$

Capacitor 85 so functions in response to energy transferred to it by inductor 75 while MOSFET 81 is cut off. In addition, the current supplied by source 11 to winding 76 has considerable ripple components because it has approximately a square wave variation. When MOSFETs 81 and 87 are conducting, the currents through winding 76 are subtantially constant, at relatively high, and low positive values, respectively. Energy from capacitor 85 is transferred to transformer 71 while MOSFET 81 is conducting. When MOSFET 86 cuts off, and MOSFET 81 conducts, the energy transferred to transformer 71 from capacitor 85 is transferred by transformer 71 to capacitor 34 by way of diode 32. Winding 76 delivers energy to transformer 71 from source 11 while MOSFET 81 is cut off.

The circuit of FIG. 5 enables the turns ratio between windings 73 and 74 to be reduced by a factor of 2 because of the gain factor of 2 in Equation 4. The circuit of FIG. 5 has a higher degree of symmetry than the circuits of FIGS. 1, 3 and 4 because primary winding 73 is driven in push-pull relation. The circuit of FIG. 5 requires a transformer having a single primary winding, in contrast to the bifilar, dual winding primary of the circuit of FIG. 1. However, the circuit of FIG. 5 requires a relatively complex input inductor 75 and the square wave current causes a high input ripple current to be supplied by source 11 to winding 76. While the waveforms in the circuit of FIG. 5 differ considerably from those in the circuits of FIGS. 1, 3 and 4, there is a sinusoidal current flowing in secondary winding 74 while MOSFET 81 is conducting. This sinusoidal variation ends prior to cut off of MOSFET 81 because of the polarity reversal of the current having a tendency to flow from winding 74 to capaciitor 34 by way of diode 32, which current reversal causes cut off of diode 32.

Figure 6:
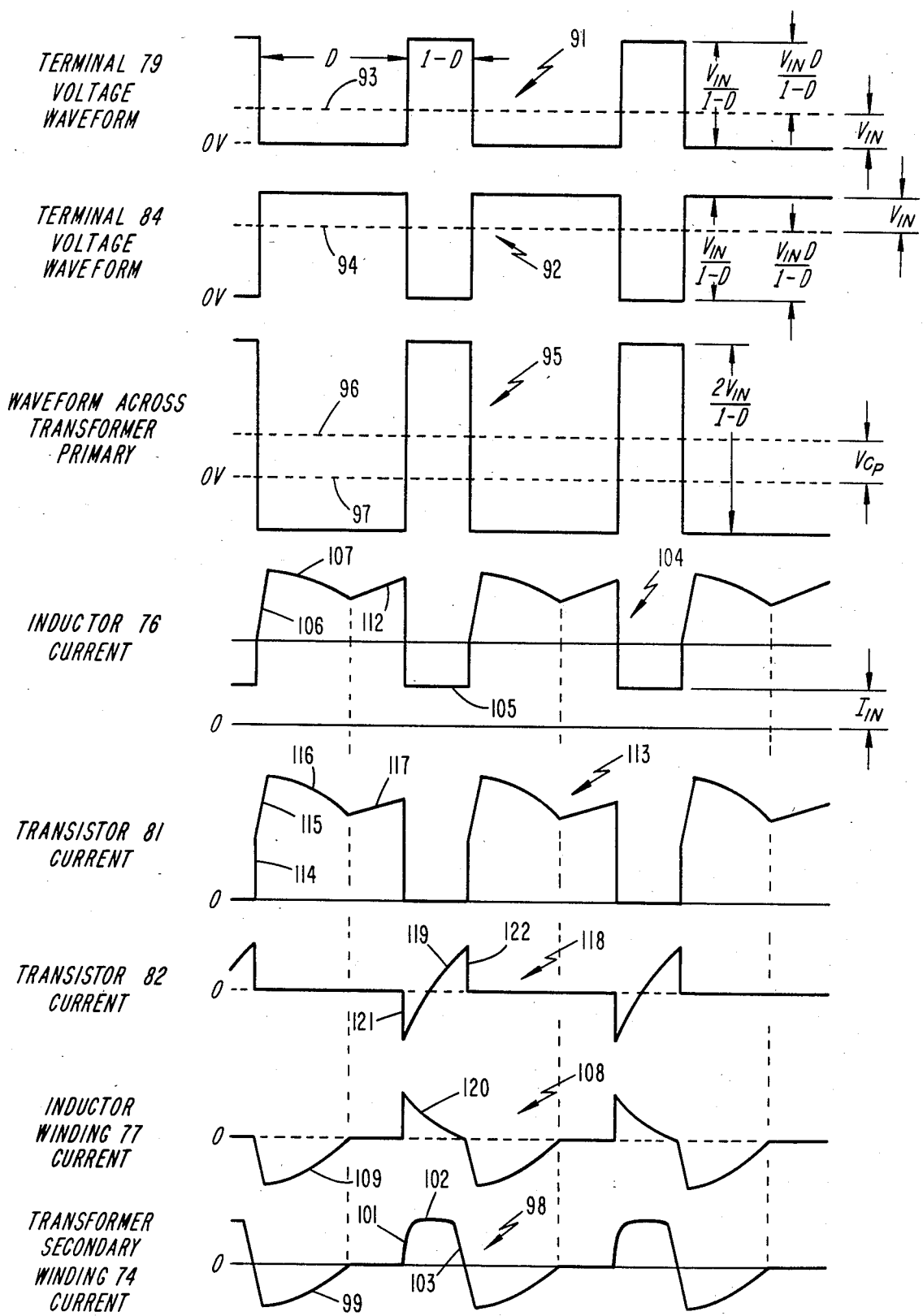
FIG. 6 is a series of waveforms used for describing the operation of the circuit of FIG. 5.

To consider the operation of the circuit of FIG. 5 in greater detail, consideration is now given to the waveforms of FIG. 6. During steady state operation, the voltages at terminals 79 and 84 are complementary rectangular waves, as indicated by waveforms 91 and 92, FIG. 6. Waveform 91 has a DC, average value of $V_{IN}$ in response to the application of the voltage of source 11 to terminal 79 through winding 76. In contrast, the DC, average value at terminal 84 is equal to the DC voltage applied by capacitor 85 through winding 77 to terminal 84, i.e., $$\frac{V_{IN}D}{(1-D)}.$$

Each of waveforms 91 and 92 has a zero base value because terminals 79 and 84 are connected to the negative electrodes of source 11 and capacitor 85 by way of MOSFETs 81 and 86 during different portions of a cycle of source 24. The positive excursion of each of waveforms 91 and 92 is $$\frac{V_{IN}}{(1-D)}$$

above the zero base value, whereby the deviation between the maximum value of waveform 91 and the average value thereof is $$\frac{V_{IN}D}{(1-D)}.$$

The deviation of the maximum value of waveform 92 the average value thereof is $V_{IN}$.

The voltages at terminals 79 and 84 are respectively applied to the dotted terminal of winding 73 and to the undotted terminal of the winding. The latter connection is by way of capacitor 83, causing the voltage impressed across winding 83 to have the rectangular wave variation indicated by waveform 95. Waveform 95 includes positive and negative segments which occur when MOSFETs 86 and 81 are respectively forward biased. The voltage between the positive and negative segments of waveform 95 is $$\frac{2V_{IN}}{(1-D)}$$

by virtue of the push-pull nature of the complementary waverorms applied to opposite terminals of winding 73. Because of the AC coupling of the voltages between terminals 79 and 84 to winding 73, the average value of waveform 95 is zero volts, while the voltage, $V_{83}$, across capacitor 83, is equal to the difference between the input voltage of source 11 and the voltage across capacitor 85. The voltage across secondary winding 74 has the same shape as indicated by waveform 95, with a DC average value, and a peak to peak variation of $$\frac{2V_{IN}N_S}{(1-D)N_P}.$$

In response to the voltage applied to secondary winding 74, the current indicated by waveform 98 flows through the secondary winding. When MOSFET 81 is forward biased, the undotted terminal of winding 74 is positive relative to the dotted terminal of secondary winding and current waveform 98 has a sinusoidal like variation 99. Sinusoidal like variation 99 begins simultaneously with forward biasing of MOSFET 81 and continues for approximately one-quarter of a cycle of the period of the resonant circuit coupled to winding 74, which resonant circuit includes the parasitic inductance between windings 73 and 74, as well as capacitor 34 and capacitor 83. This waveform may or may not reach zero when MOSFET 81 cuts off depending upon the choice of resonant frequency, operating duty cycle and value of load 12. If the current reaches zero before MOSFET 81 is switched off, the resonant circuit current has a tendency to change polarity. Such a polarity change can not be tolerated by diode 32, whereby variation 99 ends and the current in transformer winding 74 is zero, as shown in waveform 98.

When MOSFET 86 is activated to a forward biased condition, the voltage impressed between the terminals of winding 73 suddenly increases, as indicated by the positive going transition of waveform 95. In response to the sudden increase in voltage across primary winding 73, there is a corresponding sudden increase in the voltage across secondary winding 74. In response to the sudden increase in the voltage across secondary winding 74, diode 31 is forward biased and positive going steep current segment 101 suddenly flows from winding 74 through capacitor 34 and diode 31 to load 12 and shunt capacitor 13.

In response to MOSFET 86 being back biased, the voltage across secondary winding 74 changes suddenly in the negative direction, as indicated by waveform 95. If waveform segment 101 has not returned to zero, diode 31 is cut off by the voltage polarity reversal, causing a steep negative going current segment to flow. The current flowing through transformer winding 74 when diode 31 is conducting between segments 101 and 103 is indicated by positive sinusoidal like variation 102. Wave segment 103 causes a sudden reversal in the current flowing through transformer 74 so that the initial value of current wave segment 99, when diode 32 begins to conduct, is the peak negative value thereof.

The current variations indicated by waveform 98 in secondary winding 74 are reflected to primary winding 73 to affect the current flowing in the components connected to the primary winding. In particular, sinusoidal variation 99 affects the current flowing through windings 76 and 77, as well as MOSFET 81, while wave segments 101-103 affect the current flowing in winding 77 and MOSFET 86.

The current flowing from source 11 through winding 76 to terminal 79 has the shape indicated by waveform 104, FIG. 6. When MOSFET 86 is forward biased, the current flowing from source 11 through winding 76, thence winding 73 and capacitor 83 to the source drain path of MOSFET 86 has a constant non-zero value indicated by wave segment 105. In response to MOSFET 81 being forward biased, there is a sudden increase in the current flowing through winding 76 by virtue of the reduced impedance between terminal 79 and the negative electrode of source 11 through the source drain path of the MOSFET; this sudden increase in current is indicated by steep positive going wave segment 106.

As time progresses during the conduction interval of MOSFET 81, the current flowing through winding 76 decreases, to a certain extent, as indicated by waveform segment 107. Waveform segment 107 contains several components, one being a positive going ramp that source 11 tends to apply through winding 76 and the source drain path of MOSFET 81. A second component of segment 107 is sinusoidal variation 99 coupled from secondary winding 74 to primary winding 73, in turn coupled by winding 77 to winding 76. In addition, segment 107 includes a ramp current induced in winding 73 from magnetic core 72 of transformer 71. Segment 107 continues with the sinusoidal component 99 until diode 32 cuts off. In response to sinusoidal component 99 ending the current through winding 77 is stabilized at a constant value indicated by waveform segment 111 of waveform 108. While sinusoidal variation 99 subsists, the current through winding 77 has a sinusoidal variation 109 that is a scaled replica of waveform segment 99. After sinusoidal like variation 109 has ceased and the current through winding 77 has stabilized, as indicated by wave segment 111, the current flowing through winding 76 increases in a ramp like nature as indicated by waveform segment 112. Thus, wave segment 112 is analogous to segment 58 of waveform 56.

In response to the current flowing through winding 76, the current flowing through the source drain path of transistor 81 has the shape indicated by waveform 113. Waveform 113 includes a positive DC segment which flows through MOSFET 81 when the MOSFET is forward biased; waveform 113 has a zero value when no current flows through the MOSFET while it is back biased. The positive segment of waveform 113 includes initial very steep positive going segment 114, followed immediately by relatively steep positive going segment 115. Upon completion of segment 115, the current through transistor 81 includes a sinusoidal like variation 116, that is a substantial replica of segment 107. When sinusoidal variation 99 ends, the current flowing through MOSFET 81 increases in a ramp like manner indicated by wave segment 117, a replica of wave segment 112.

The current flowing through the source drain path of MOSFET 86 is indicated by waveform 118. When MOSFET 86 is cut off, zero current flows through it. When MOSFET 86 is forward biased, current with two components flows between the source and drain electrodes thereof, as indicated by positive going sinusoidal like wave segment 119. One component, having a waveform indicated by sinusoidal waveform segment 120 of waveform 108, flows from capacitor 85 through winding 77 and the source drain path of MOSFET 86. The other component, indicated by wave segment 105, flows from source 11 through winding 73 and capacitor 83 to the MOSFET source drain path.

The relatively constant value of wave segment 105 and the negative going sinusoidal wave segment 120 are combined at terminal 84 to produce current wave segment 119. Initially, current wave segment 119 has a negative value, followed by a positive value, with a resulting average value equal to zero because both capacitor 85 and transformer winding 73 have no steady state DC current component through them. Initially, the current flowing through MOSFET 86 has a sudden negative change, indicated by segment 121 of waveform 118. When MOSFET 86 is cut off, there is a sudden negative change in the current flowing through it, as indicated by wave segment 122. When wave segment 119 is negative, current flows through the antiparallel diode which is integral to the MOSFET. The current associated with the positive portion of wave segment 119 flows through the source drain path of MOSFET 86.

Figure 7:
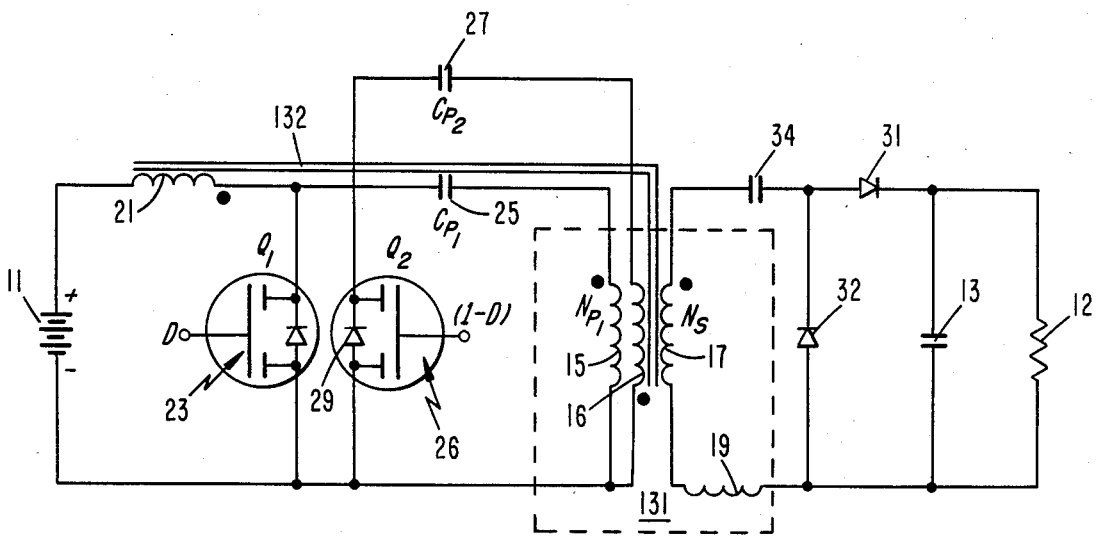
FIG. 7 is a circuit diagram of a modification of the invention wherein an input inductance means is magnetically coupled to the transformer and which is applicable to the circuits of FIGS. 1, 3, 4, and 5.

In accordance with a further aspect of the present invention, which is applicable to each of the embodiments of FIG. 1, 3, 4 and 5, but which is illustrated in FIG. 7 only in connection with the embodiment of FIG. 1, the input inductance means is magnetically coupled to the transformer, by virtue of the input inductance means and the transformer being wound on the same magnetic core. In the embodiment of FIG. 7, the input inductor means, in the form of coil 21, and transformer 131 include a common magnetic core 132 on which are wound coil 21, as well as windings 15, 16 and 17.

By winding coil 21 and windings 15-17 on a single magnetic core, the size, weight and cost of the circuit are reduced with the attendant reduction in the number of magnetic cores. It is possible to wind coil 21 and windings 15–17 on a single core 132 because the voltage waveforms across the coil and primary transformer windings are essentially replicas of each other. While it would appear that the number of turns of coil 21 and of primary windings 15 and 16 should be the same, it has been found that a considerable reduction in input ripple current occurs if coil 21 has slightly more turns than windings 15 and 16. If the embodiment of FIG. 5 is configured so that transformers 71 and 74 have a common core, each of windings 76 and 77 of transformer 74 has one-half the number of turns as primary winding 73.

Preferably, core 132 is designed so that there is minimum current coupling between coil 21 and transformer windings 15–17 so that energy is not transferred from source 11 to transformer 131 directly through magnetic coupling between them as this will increase this ripple current. To enable core 132 to tolerate DC flux introduced into it in response to the DC current flowing through coil 21, it appears desirable to gap the core.

Many different types of secondary circuits can be employed, as long as current flows in the secondary winding in first and second opposite directions while the first and second primary winding switches are closed and the secondary circuit provides an output voltage which is equal to the peak to peak value of the transformer secondary voltage or an integral multiple thereof. Exemplary of secondary winding circuits which fulfill this requirement, as well as providing other advantages, are illustrated in FIGS. 8–11. The secondary circuits illustrated in FIGS. 8–11 are applicable for each of the embodiments of FIGS. 1, 3, 4, 5 and 7.

Figure 8:
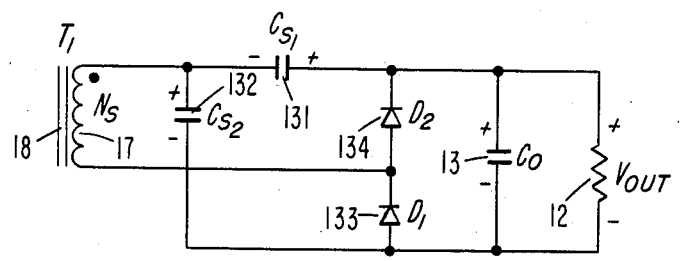
FIG. 8 is a circuit diagram of a modified output circuit, employing voltage multiplication circuitry.

The secondary circuit illustrated in FIG. 8 is another form of a diode pump rectifier having an output voltage equal to the peak to peak value of the input waveform thereof, i.e. equal to the voltage across the secondary load driving windings of any of the circuits of FIGS. 1, 3–5 and 7. The circuit of FIG. 8 changes the half wave rectified output of the secondary circuits of FIGS. 1, 3, 4, 5 and 7 to a full wave rectified output with typically one-half of the output ripple voltage associated with the previously mentioned embodiments. The full wave rectifier of FIG. 8 performs most effectively when the duty cycles of MOSFETS 23 and 26 are in the region of 50%, i.e., when MOSFETs 23 and 26 are in conducting and cut off states for approximately the same duration.

The circuit of FIG. 8 includes capacitors 131 and 132, having a common connection to the dotted terminal of secondary winding 17. The undotted terminal of winding 17 is connected to a common terminal for the cathode of diode 133 and the cathode of diode 134. Diodes 133 and 134 are series connected with each other so that the anode of diode 133 and the cathode of diode 134 are respectively connected to the electrodes of capacitors 132 and 131 which are not connected to the dotted terminal of winding 17. The anode of diode 133 and cathode of diode 134 are respectively connected to opposite terminals of the parallel combination of load 12 and shunt capacitor 13.

In operation, current flows from the anode of diode 134 to the cathode thereof to provide a relatively low impedance from secondary winding 17 to primary winding 16 while MOSFET 23, FIG. 1, is forward biased. In addition, because of the charge accumulated on capacitors 131 and 132, current flows from winding 17 to load 12 by way of diode 134 and capacitor 132 while MOSFET 23 is conducting. When MOSFET 23 is conducting current flows through diode 134 through capacitor 131 and winding 17 to restore charges on capacitor 131. Current flows from secondary winding 17 through diode 133 and capacitor 131 when MOSFET 26 is conducting. Thereby, full wave rectification is provided with the circuit of FIG. 8.

Figure 9:
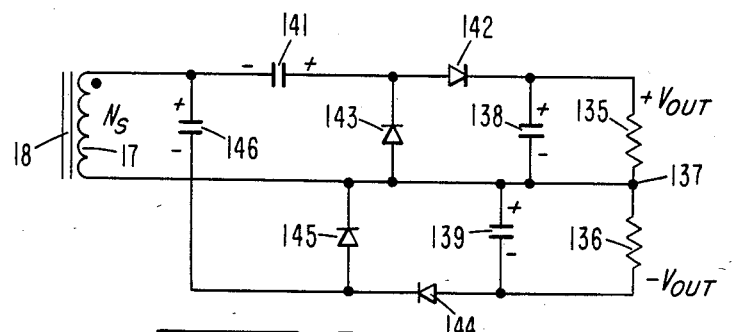
FIG. 9 is a modification of the output circuitry, particularly adapted for bipolarity loads.

In the secondary circuit of FIG. 9, bipolarity DC voltages are derived across loads 135 and 136 relative to the voltage at terminal 137, such that the voltages across loads 135 and 136 are respectively positive and negative. Loads 135 and 136 are respectively shunted by capacitors 138 and 139.

Current is applied to load 135 from transformer secondary winding 17 by way of the series connection of capacitor 141 and diode 142 during the interval while MOSFET 23, FIG. 1, is cut off. During the interval while MOSFET 23 is forward biased, secondary winding 17 is shunted by current flowing through diode 143.

To enable the negative voltage to be developed across load 136, series diode 144 and shunt diode 145 are connected so they are polarized oppositely from diodes 142 and 143. A common terminal for diodes 144 and 145 is connected by capacitor 146 to the dotted terminal of secondary winding 17. While MOSFET 23 is conducting and diode 143 and capacitor 141 shunt secondary winding 17, current is supplied from the undotted terminal of winding 17 through load 136 and diode 142, thence capacitor 146 to the dotted terminal of winding 17. When MOSFET 23 cuts off, current flows from the dotted terminal of winding 17 through capacitor 146 and diode 145 to the undotted terminal of winding 17 simultaneously with current being supplied from winding 17 to load 135 by way of capacitor 141 and diode 142. From the foregoing, it is apparent that opposite polarity voltages are developed across loads 135 and 136.

Figure 10:
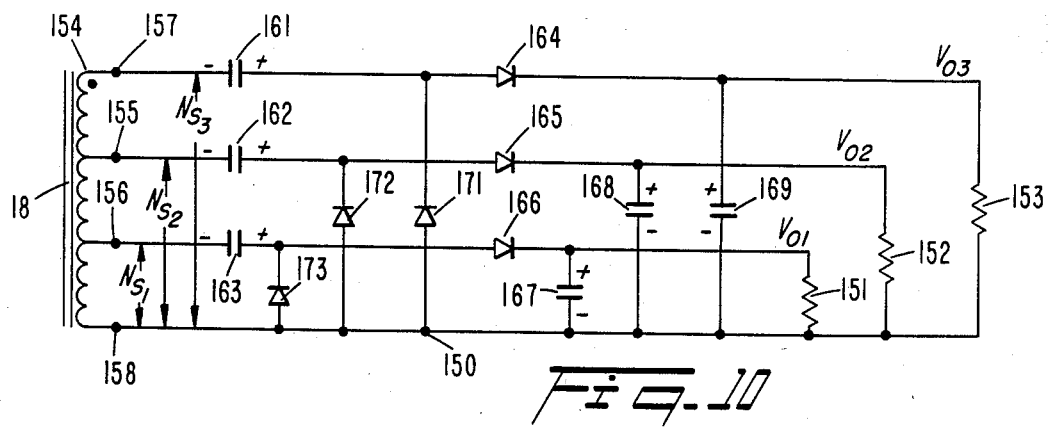
FIG. 10 is a modification of the output circuitry wherein three loads are connected to the transformer secondary winding in a non-isolated manner.

Reference is now made to FIG. 10 of the drawing wherein three separate positive DC voltages, each referenced to terminal 150, are derived across loads 151, 152 and 153. Loads 151, 152 and 153 are responsive to voltages derived from transformer secondary winding 154 including intermediate taps 155 and 156, as well as end terminals 157 and 158. All of the turns between end terminals 157 and 158 are wound in the same direction so that a positive current flows out of dotted end terminal 157, as well as intermediate taps 155 and 156, in response to positive current flowing into the dotted terminal of primary winding 15, FIG. 1.

Terminal 157 and taps 155 and 156 are respectively connected in series to capacitors 161, 162 and 163. Capacitors 161, 162 and 163 are respectively connected to loads 153, 152 and 151 by way of series connected diodes 164, 165 and 166, each polarized so that positive current flows from winding 154 through the diodes to the loads, which are respectively shunted by capacitors 167, 168 and 169. Common terminals for capacitors 161, 162, and 163 and diodes 164, 165 and 166 are respectively shunted by diodes 171, 172 and 173. Diodes 171, 172 and 173 are polarized so that current flows through them in response to the voltage at terminal 158 being greater than the voltages at terminal 157 and taps 155 and 156. The voltages developed across loads 151, 152 and 153 differ because of the different number of turns in winding 154 between terminal 158 and the terminal and taps supplying driving voltages to the loads. In particular, the highest and lowest voltages are applied to loads 151 and 153, while an intermediate voltage is applied to load 152.

Each of loads 151–153 is driven by a half wave rectified current in the same manner that load 12 is driven by the half wave rectified current from winding 17. Thereby, when MOSFET 23 is conducting, diodes 171, 172 and 173 are forward biased to the exclusion of diodes 164, 165 and 166. Current stops flowing through diodes 171-173 prior to cut off of MOSFET 23. When MOSFET 23 cuts off, current flows to loads 151, 152 and 153 by way of diodes 166, 165, and 164, respectively.

Figure 11:
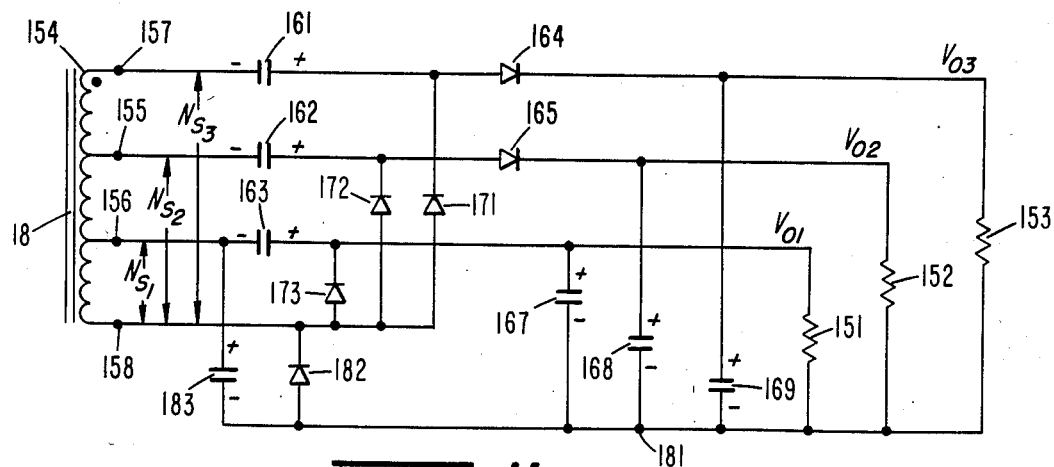
FIG. 11 is a circuit diagram of a further output circuit wherein three outputs are derived, with two of the outputs being driven by a half wave rectifier, and the third output being driven by a full wave rectifier.

The full wave, secondary circuit of FIG. 8 can be combined with the multiple output, non-isolated circuit of FIG. 10 in the manner illustrated in FIG. 11. High and intermediate half wave rectified voltages are respectively applied to loads 153 and 152 in FIG. 11 from terminal 157 and tap 155 of transformer 154. A full wave rectified voltage is applied to load 151 by way of a voltage doubler connected between tap 156 and terminal 158. All of the voltages developed across loads 151-153 respectively shunted by capacitors 167-169, are referenced to terminal 181. Capacitors 161-163, as well as diodes 164, 165, 171, 172 and 173 are connected to terminals of loads 151-153 in exactly the same manner as described for the embodiment of FIG. 10, except that the return path from terminal 181 back to transformer terminal 158 is through diode 182, connected between terminals 181 and 158. Diode 182 is part of the full wave circuit for load 151. The full wave circuit for load 151 also includes capacitor 183, connected between terminals 156 and 181.

When MOSFET 23 is cut off, current flows from secondary winding 154 through diodes 164 and 165 and loads 152 and 153, as well as capacitors 168 and 169, to terminal 181, thence through diode 182 to terminal 158. Simultaneously, current flows from tap 156 through load 151 and capacitor 167 to terminal 181, thence through diode 182 to terminal 158. When MOSFET 23 is conducting, current flows from terminal 158 through diodes 171, 172 and 173, respectively, to capacitors 161, 162 and 163, thence to terminal 157 and taps 155 and 156. Simultaneously, current flows from tap 158 through diode 173 and diode 151 returning to terminal 156 through capacitor 183 providing the full wave rectifying effect for load 151.

While there have been described and illustrated several specific embodiments of the inventions, it will be clear that variations in the details of the embodiments specifically illustrated and described may be made without departing from the true spirit and scope of the invention as defined in the appended claims.

I claim:

1. A converter responsive to a DC source for driving a DC load comprising a transformer having winding means including primary and secondary winding means, inductor means series connected between the source and the primary winding means, first switch means for shunting current flowing from the source through the inductor means when closed, resonant circuit means coupled to the winding means, second switch means connected to the primary winding means, rectifier means connected between the secondary winding means and the load, means for activating the first and second switches to be opened and closed at mutually exclusive times at a predetermined frequency, the first switch means being connected to the inductor means and primary winding means so that a first current component from the supply flows through it via the inductor means and a second current component having a sinusoidal component flows through it in response to discharge of energy stored in the resonant circuit means, the second component beginning approximately simultaneously with closure of the first switch means, the second switch means when closed being connected so that a third bi-directional current component flows through it in response to energy stored in the inductor means, the rectifier means being connected between the secondary winding means and the load so the secondary winding means supplies substantial current to the load, and means responsive to the DC source for supplying energy to the primary winding means.

2. The converter of claim 1 further including blocking capacitor means connected in series with the winding means for preventing the flow of DC curent in the winding means.

3. The converter of claim 2 wherein the primary winding means includes first and second closely coupled primary windings, the blocking capacitor means including a first capacitor, the first primary winding being connected in series with the first capacitor and the inductor means to be responsive to current flowing from the source through the inductor means when the first switch means is open, a second capacitor, the second primary winding and second switch means being connected in series with the second capacitor to provide a discharge path for the secondary winding means when the second switch means is closed.

4. The converter of claim 3 further including a third capacitor connected in series with the secondary winding means, the rectifier means including first and second diodes, the first diode being connected to shunt the series connection of the third capacitor and secondary winding and poled to conduct current when one of the switch means is closed, the current flowing through the first diode being cut off in response to a tendency for it to change polarity prior to the first switch means being open, the second diode being connected in series between the load and the series connection of the third compacitor and secondary winding and poled to conduct current when the other switch means is closed.

5. The converter of claim 1 further including capacitor means connected in series blocking relation with the inductor means and the primary winding means so that the first switch means is connected in a DC path with the DC source, the capacitor means being connected in series with the primary winding means and the second switch means.

6. The converter of claim 5 wherein the primary winding means includes first and second closely coupled primary windings, the capacitor means including a first capacitor connected in series with the first primary winding means and a second capacitor connected in series with the second switch means and the second primary winding.

7. The converter of claim 5 wherein the primary winding means includes a primary winding and the inductor means includes an input transformer having first and second windings, the first winding being connected in series with the source and the primary winding, the capacitor means including a storage capacitor and another capacitor, the another capacitor being connected in series with the primary and second windings as well as the storage capacitor and the first switch means when the first switch means is closed, the another capacitor being connected in series with the primary winding, second switch means, storage capacitor and second winding when the second switch means is closed, the current flowing in first and second opposite directions in the storage capacitor while the first and second switches are respectively closed.

8. The converter of claim 5 wherein the inductor means includes a coil, the primary winding means includes a primary winding, the capacitor means including first and second capacitors, the first capacitor being a blocking capacitor connected in series with the coil and primary winding so that the first switch means and coil are connected in DC circuit with the source, the second capacitor being connected in series with the second switch means and the primary winding.

9. The converter of claim 8 wherein the second capacitor and second switch means are connected in shunt with the primary winding.

10. The converter of claim 8 wherein the second capacitor and second switch means are connected in shunt with the series connection of the primary winding and first capacitor.

11. The converter of claim 1 wherein the value of the capacitance means and the frequency are such that voltage changes across the capacitance means during each cycle are small relative to the voltage of the source.

12. The converter of claim 1 further including means for inductively coupling the inductor means to the transformer so that the inductor means and primary winding means have approximately the same voltage waveforms.

13. The converter of claim 12 wherein the inductor means has slightly more turns than the primary winding to reduce the ripple current supplied by the DC source to the inductor means.

14. The converter of claim 1 wherein the inductance means includes a coil connected between the source and first switch, the coil having an inductance value and the frequency being such that current flows continuously with ramp like variations while the first and second switch means are closed.

15. The converter of claim 1 further including a capacitor connected in series with the secondary winding means, the rectifier means including first and second diodes, the first diode being connected to shunt the series connection of the third capacitor and secondary winding and poled to conduct current when one of the switch means is closed, the current flowing through the first diode being cut off in response to a tendency for it to change polarity prior to the one switch means being open, the second diode being connected in series between the load and the series connection of the diode and secondary winding and poled to conduct current when the other switch means is closed.

16. The converter of claim 1 wherein the resonant circuit means includes parasitic inductance resulting from loose coupling between the primary and secondary winding means.

17. A converter responsive to a DC source for driving a DC load comprising a transformer having primary and secondary windings, an input inductance, the input inductance including a transformer having first and second windings each having first terminals respectively connected to opposite ends of the primary windings, second terminals of the first and second windings being respectively connected to the source and a storage capacitor, first and second switches respectively connected in shunt with opposite terminals of the primary winding, the first and second switches being opened and closed at mutually exclusive times to drive the primary winding in push-pull relation, rectifier means connected between the secondary winding and the load for (a) enabling current to flow in the secondary winding in a first direction for only a portion of the time while one of the switches is closed and (b) enabling current to flow in a second direction in the secondary winding while the other switch is closed and for coupling the current flowing in the second direction to the load, resonant circuit means coupled to the transformer, the resonant circuit having reactances causing the current flowing in the first direction to have a sinusoidal component.

18. The converter of claim 17 further including a blocking capacitor connected in series with the primary winding between the connections of first and second switches to the primary winding.

19. A converter responsive to a DC source for driving a DC load comprising a transformer having primary and secondary winding means, inductance means series connected between the source and primary winding means, switch means having first and second states, the switch means being connected, when in the first state, to shunt current flowing from the source to the inductance means to prevent the shunt current from flowing to the primary winding means, the inductance means having a value such that only unidirectional current having a non-zero value flows through it, impedance means coupled with the inductance means and the switch means and the transformer tending to cause resonant current to flow in the primary and secondary winding means and to cause unidirectional current having a substantial sinusoidal variation to flow in the switch means while the switch means is in the first state and a bi-directional current to flow in the switch means while the switch means is in the second state, rectifier means connected to the secondary winding means for shunting the flow of current in the secondary winding means away from the load while the first switch means is in one of the states and for supplying current flowing in the secondary winding means to the load while the first switch means is in the other of the states.

20. The inverter of claim 19 wherein the inductor means has an inductance value causing bidirectional ramping current segments to flow continuously therein during intervals while the switch means is respectively in the first and second states.

21. The converter of claim 20 further including means for inductively coupling the inductor means to the transformer so that the inductor means and primary winding means have approximately the same voltage waveforms.

22. The converter of claim 21 wherein the inductor means has slightly more turns than the primary winding to reduce the ripple current supplied by the DC source to the inductor means.

23. The converter of claim 19 further including means for inductively coupling the inductor means to the transformer so that the inductor means and primary winding means have approximately the same voltage waveforms.

24. The converter of claim 23 wherein the inductor means has slightly more turns than the primary winding means to reduce the ripple current supplied by the DC source to the inductor means.

25. The converter of claim 19 further including capacitor connected in series with the secondary winding means, the rectifier means including first and second diodes, the first diode being connected to shunt the series connection of the third capacitor and secondary winding and poled to conduct current when the switch means is in first state, the second diode being connected in series between the load and the series connection of the first diode and secondary winding and poled to supply current to the load when the switch means is in the second state.

26. The converter of claim 19 wherein the primary and secondary winding means are loosely coupled to form a parasitic reactance that affects the durations of the shunt current.

27. A converter responsive to a DC source for driving a DC load comprising a transformer having primary and secondary winding means, inductance means series connected between the source and primary winding means, first switch means having open and closed states, the first switch means being connected, when closed, to shunt current flowing from the source to the inductance means to prevent the shunt current from flowing to the primary winding means, impedance means coupled with the transformer tending to cause resonant current to flow in the primary and secondary winding means, rectifier means connected to the secondary winding means for shunting the flow of current in the secondary winding means away from the load while the first switch means is in one of the states and for supplying current flowing in the secondary winding means to the load while the first switch means is in the other of the states, wherein there is a tendency for the voltage across the first switch means to increase appreciably when the first switch means is initially in the open state, and means for controlling the voltage across the first switch means when it is initially in the open state.

28. The converter of claim 27 wherein the means for controlling includes second switch means connected when closed to shunt current in the primary winding means and enabling current to be coupled between the source and the primary winding means, the first and second switch means being open and closed at mutually exclusive times.

29. The converter of claim 28 wherein the inductor means includes a coil, the primary winding means includes a primary winding, a blocking capacitor connected in series with the coil and primary winding so that the first switch means and coil are connected in DC circuit with the source, a second capacitor being connected in series with the second switch means and the primary winding.

30. The converter of claim 29 wherein the second capacitor and second switch means are connected in shunt with the primary winding.

31. The converter of claim 28 wherein the primary winding means includes a primary winding and the inductor means includes an input transformer having first and second windings, the first winding being connected in series with the source and the primary winding, the capacitor means including a storage capacitor and another capacitor, the another capacitor being connected in series with the primary and second windings as well as the storage capacitor and the first switch means when the first switch means is closed, the another capacitor being connected in series with the primary winding, second switch means, storage capacitor and second winding when the second switch means is closed, the current flowing in first and second opposite directions in the storage capacitor while the first and second switches are respectively closed.

32. The converter of claim 28 wherein the primary winding means includes first and second closely coupled primary windings, a first capacitor connected in series with the first primary winding and a second capacitor connected in series with the second switch means and the second primary winding.

33. A converter responsive to a DC source for driving a DC load comprising transformer means having an untapped primary winding having first and second terminals and a secondary winding, rectifier means connected between the secondary winding and the load, circuit means connected between the DC source and the first and second terminals of the primary winding, the circuit means including switching means connected to the source and the primary winding so that when the switch means is respectively activated in first and second states current flows in first and second opposite directions through the first and second terminals, the switching means being activated with a duty cycle D, where D is greater than zero and less than one, the transformer means, circuit means and rectifier means being interconnected so that the DC load voltage, $V_o$, is related to the voltage $V_{IN}$ supplied to the circuit means by the DC source in accordance with $$V_o = \frac{KV_{IN}}{1-D}$$

where K is a constant related to the number of turns of the primary and secondary windings.

34. The converter of claim 33 wherein $0.2 \leq D \leq 0.8$.

35. The converter of claim 33 wherein the switch means includes first and second switches open and closed at mutually exclusive times, the first switch, when closed, being connected to the source and the transformer means to decouple the current from the source from the primary winding, the second switch, when closed, being connected to the transformer means to provide a discharge path for energy stored in the transformer means when the first switch means is closed, the first and second switches respectively being closed with complementary duty cycles of D and $(1-D)$ respectively.

* * * * *